United States Patent
Inayatullah et al.

(10) Patent No.: US 10,779,039 B2
(45) Date of Patent: Sep. 15, 2020

(54) SYSTEMS AND METHODS FOR A USER-DEFINED EXPERIENCE

(71) Applicant: NBCUniversal Media, LLC, New York, NY (US)

(72) Inventors: Azfar Inayatullah, Englewood Cliffs, NJ (US); Sanjay Macwan, Englewood Cliffs, NJ (US)

(73) Assignee: NBCUniversal Media, LLC., New York, NY (US)

( * ) Notice: Subject to any disclaimer, the term of this patent is extended or adjusted under 35 U.S.C. 154(b) by 710 days.

(21) Appl. No.: 14/854,173

(22) Filed: Sep. 15, 2015

(65) Prior Publication Data

US 2016/0381421 A1 Dec. 29, 2016

Related U.S. Application Data

(60) Provisional application No. 62/186,209, filed on Jun. 29, 2015.

(51) Int. Cl.
*H04N 21/414* (2011.01)
*H04N 21/45* (2011.01)
(Continued)

(52) U.S. Cl.
CPC ... *H04N 21/4532* (2013.01); *H04N 21/41407* (2013.01); *H04N 21/4383* (2013.01);
(Continued)

(58) Field of Classification Search
CPC ............ H04N 21/8133; H04N 21/812; H04N 21/4755; H04N 21/4621; H04N 21/4524;
(Continued)

(56) References Cited

U.S. PATENT DOCUMENTS 8,655,307 B1 * 2/2014 Walker .............. H04W 52/0212
455/343.5
2009/0290644 A1 * 11/2009 Gordon .......... H04N 21/234327
375/240.25
(Continued)

*Primary Examiner* — Nasser M Goodarzi
*Assistant Examiner* — Patrick A Ryan
(74) *Attorney, Agent, or Firm* — Fletcher Yoder P.C.

(57) ABSTRACT

In one embodiment, a method is provided. The method includes using a processor to receive pre-defined rules related to one or more desired characteristics of available digital content. The pre-defined rules indicate user preferences for receiving the available digital content with a personal computing device. The method further includes using a processor to determine current operating conditions corresponding to the pre-defined rules and to identify the one or more desired characteristics of available digital content based on the pre-defined rules and the current operating conditions. The method also includes using a processor to identify a data channel from one or more data channels. The identified data channel is configured to receive the available digital content from a content delivery system based on the pre-defined rules and the current operating conditions. The method also includes using the processor to receive digital content with the personal computing device via the identified data channel, where the received digital content includes the one or more desired characteristics.

20 Claims, 3 Drawing Sheets

(51) Int. Cl.
*H04N 21/438* (2011.01)
*H04N 21/81* (2011.01)
*H04N 21/475* (2011.01)
*H04N 21/454* (2011.01)
*H04N 21/462* (2011.01)

(52) U.S. Cl.
CPC ....... *H04N 21/454* (2013.01); *H04N 21/4524* (2013.01); *H04N 21/4622* (2013.01); *H04N 21/4755* (2013.01); *H04N 21/812* (2013.01)

(58) Field of Classification Search
CPC ......... H04N 21/4383; H04N 21/41407; H04N 21/2668; H04N 21/4532
See application file for complete search history.

(56) References Cited

U.S. PATENT DOCUMENTS

| | | | |
|---|---|---|---|
| 2015/0281303 A1* | 10/2015 | Yousef | H04N 21/643 |
| | | | 709/219 |
| 2015/0296259 A1* | 10/2015 | Son | H04N 21/8186 |
| | | | 725/110 |
| 2016/0057489 A1* | 2/2016 | He | H04N 21/4424 |
| | | | 725/14 |
| 2016/0134906 A1* | 5/2016 | James | H04N 21/23103 |
| | | | 725/110 |
| 2016/0192296 A1* | 6/2016 | Rehan | H04L 65/604 |
| | | | 455/574 |

* cited by examiner

SYSTEMS AND METHODS FOR A USER-DEFINED EXPERIENCE

CROSS-REFERENCE TO RELATED APPLICATIONS

This application claims priority of U.S. Provisional Patent Application No. 62/186,209, filed Jun. 29, 2015, which is herein incorporated in its entirety by reference.

BACKGROUND

The present disclosure relates generally to the field of digital content for the delivery of video, audio and multimedia content, and more particularly to techniques for the receiving digital content according to user-defined preferences.

Over the past decades, delivery of content to audiences (e.g., for entertainment, educational, and similar purposes) has evolved significantly. Historically, films, books, and print matter were delivered by conventional cinemas, the mail, and retail establishments. Conventional television transmissions evolved from broadcast technologies to cable, satellite and digital delivery, such as via the Internet. Moreover, distribution of content in various channels may involve broadcast, download, streaming, unicast, and so forth. However, in many situations, a user receiving the digital content may not be able to adapt the provided digital content to suit the user's needs or preferences. Accordingly, there is a particular need for systems and methods that provide a user receiving the digital content with greater control over the received digital content. In particular, it may be beneficial to provide for systems and methods that allow a user receiving digital content to define the user experience based on environmental factors and/or user-defined preferences.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In one embodiment, a method is provided. The method includes using a processor to receive pre-defined rules related to one or more desired characteristics of available digital content. The pre-defined rules indicate user preferences for receiving the available digital content with a personal computing device. The method further includes using a processor to determine current operating conditions corresponding to the pre-defined rules and to identify the one or more desired characteristics of available digital content based on the pre-defined rules and the current operating conditions. The method also includes using a processor to identify a data channel from one or more data channels. The identified data channel is configured to receive the available digital content from a content delivery system based on the pre-defined rules and the current operating conditions. The method also includes using the processor to receive digital content with the personal computing device via the identified data channel, where the received digital content includes the one or more desired characteristics.

In one embodiment, a system is provided. The system includes one or more content delivery systems configured to provide digital content via one or more data channels. The digital content includes one or more available content characteristics. The system also includes a processor-based personal computing device configured to receive the digital content. The processor-based personal computing device is configured to receive pre-defined rules from a user related to one or more desired content characteristics of the digital content and determine current operating conditions corresponding to the pre-defined rules. The current operating conditions include device-related conditions or network-related conditions. The processor-based personal computing device is also configured to identify the one or more desired characteristics of the digital content from among the available content characteristics based on the pre-defined rules and the current operating conditions.

In one embodiment, a tangible, non-transitory, computer-readable medium configured to store instructions executable by a processor of a personal computing device is provided. The instructions, when executed, are configured to receive pre-defined rules from a user related to one or more desired content characteristics of digital content. The digital content includes one or more available content characteristics. The instructions are also configured to determine current operating conditions corresponding to the pre-defined rules. The current operating conditions include device-related conditions or network-related conditions. The instructions are also configured to identify the one or more desired content characteristics among the one or more available content characteristics based on the pre-defined rules and the current operating conditions. The instructions are also configured to receive digital content with the personal computing device. The received digital content includes the one or more desired characteristics.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. It should be noted that the term "multimedia" and "media" may be used interchangeably herein.

Figure 1:
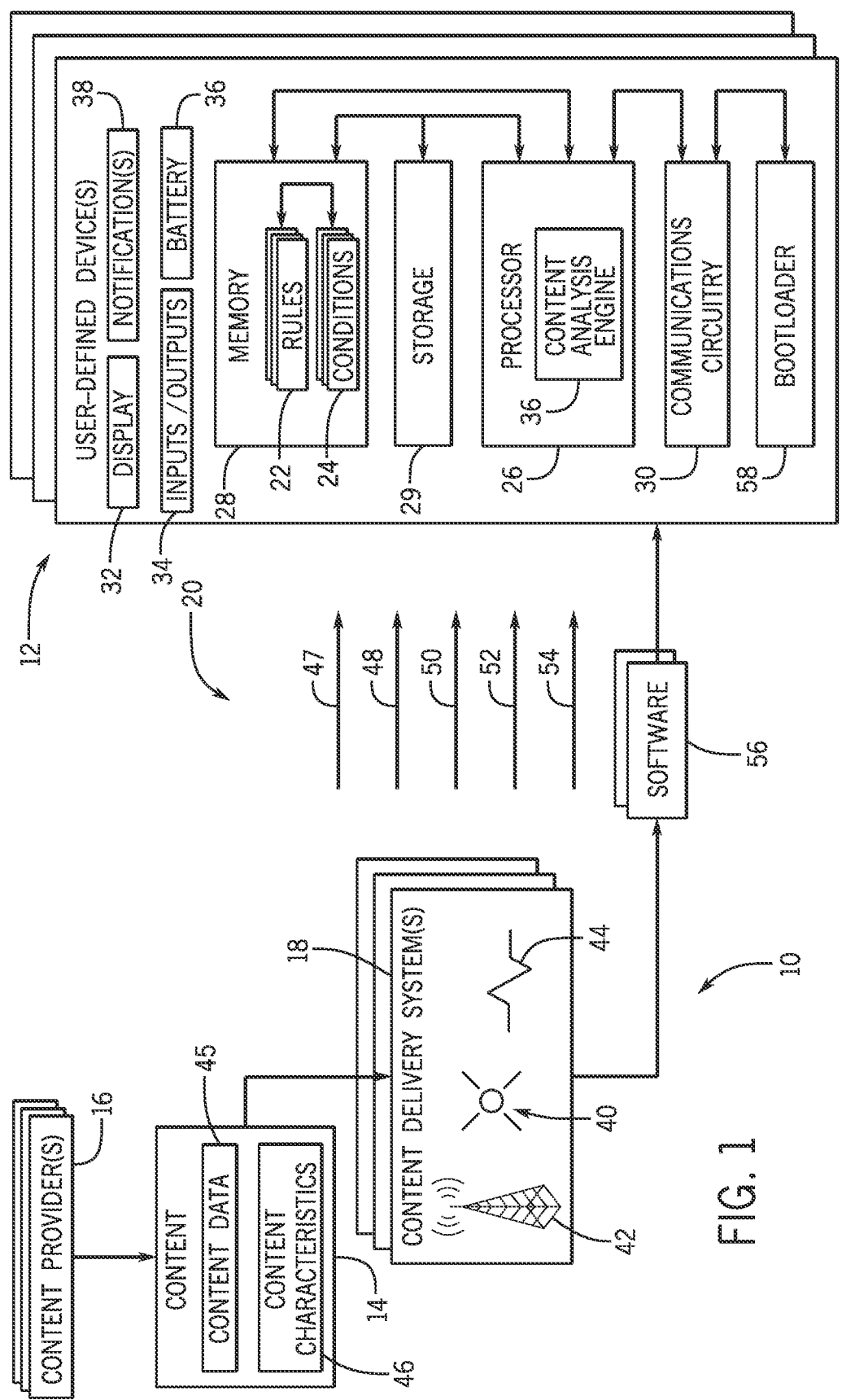
FIG. 1 is a diagrammatical overview of an exemplary digital content delivery system having a user-defined device, in accordance with aspects of the present embodiments.

Turning to the drawings, FIG. 1 is a diagrammatical representation of an exemplary digital content delivery system 10 having one or more user-defined devices 12. The user-defined device 12 may be any personal computing device utilized by a user to receive digital content 14. For example, the user-defined devices 12 may include smart-phones, computers, tablets or hand-held computers, laptops, television sets, and/or one or more computing wearable devices (e.g., wristbands, watches, goggles, glasses, necklaces, heads-up displays, etc.). The user-defined device 12 may be utilized in homes, businesses, automobiles, or other entertainment venues (e.g., theme parks, amusement parks, stadiums, theaters, shopping malls, etc.), to receive and display the digital content 14. Such user-defined devices 12 may also exchange information in a bidirectional manner with content providers 16 that supply and provide the digital content 14. In certain embodiments, various content delivery systems 18 may broadcast the digital content 14 via one or more data channels 20, and the user-defined devices 12 may receive the digital content 14 with one or more of the data channels 20, as further described in detail below.

In particular, the user-defined devices 12 may be adapted to receive digital content 14 in an individualized manner that is pre-defined or configured by the user. For example, in certain embodiments, the user-defined devices 12 may utilize a plurality of rules 22 and/or a plurality of current operating conditions 24 to receive digital content 14 in a manner that enhances the user experience. For example, the user-defined device 12 may adapt the digital content 14 based on the rules 22 and/or the current operating conditions 24, such that the resulting digital content 14 is received in a manner that is pre-defined or configured by the user. The plurality of rules 22 may be pre-defined and input by the user prior to receiving the digital content 14, may be pre-defined as manufacturing default settings, or may be pre-defined by the content providers 16. In addition, the current operating conditions 24 may be current environmental, device, system, or network factors that may be determined by the user-define devices 12 in approximately real-time, such as when digital content 14 is requested and/or distributed. Furthermore, in certain embodiments, the user-defined device 12 may select one or more data channels 20 from among the plurality of data channels 20 to receive the digital content 14 based on the rules 22 and/or the current operating conditions 24, such that the resulting digital content 14 is received in a manner that is pre-defined or configured by the user. In this manner, the user-defined device 12 may evaluate the pre-defined rules 22 and/or the current operating conditions 24 in order to provide a user-defined quality of experience when receiving the digital content 14, as further described in detail below. Accordingly, the user-defined device 12 may enhance the user experience by providing customized and individualized digital content 14, rather than automatically receive digital content 14 provided by the content providers 16 and broadcast by the content delivery systems 18.

The user-defined devices 12 may be various types of personalized devices that include a processor 26, an associated memory 28, a storage 29, and/or communications circuitry 30. In certain embodiments, the user-defined devices 12 may include one or more of a display 32, inputs/outputs 34, a battery 36, and components that provide various audio/visual notifications 38 (e.g. speakers, visual indicators, etc.). In particular, the user-defined devices 12 may be adapted for receipt of digital content 14 in real time or in near-real time as the content is distributed. For example, in certain embodiments, the user-defined devices 12 may include smart-phones, computers, tablets or hand-held computers, laptops, conventional television sets associated with a processing system (e.g., cable, satellite or set-top box), television sets configured or communicatively coupled to the Internet, and/or other personalized computing devices. In certain embodiments, the user-defined device 12 may be associated with personalized wearable devices configured for computing purposes, such as wristbands, watches, goggles, glasses, necklaces, heads-up displays, wearable electronic tattoos, and so forth. Further, it should be noted that in certain embodiments, other types of personalized devices, venues, and scenarios may be envisioned for the user-defined devices 12, such as devices 12 located in an automobile or other vehicle, or devices 12 associated with entertainment venues (e.g., theme parks, amusement parks, stadiums, theaters, shopping malls, etc.).

As noted above, the user-defined devices 12 may include the processor 26, the associated memory 28, the storage 29, and/or the communications circuitry 30. However, it should be noted that in certain embodiments, the user-define devices 12 may include multiple components as illustrated and described herein, or in certain embodiments such components may be provided in separate devices that are used in conjunction with one another. In particular, the processor 26 may include a content analysis engine 36 to evaluate the rules 22 and/or the current operating conditions 24, adapt the digital content 14 based on the rules 22 and/or conditions 24, and receive the adapted digital content 14 in a manner that is pre-defined or configured by the user, as further described below. In certain embodiments, the content analysis engine 36 may evaluate the rules 22 and/or the current operating conditions 24 in order to select an appropriate data channel 20 to receive the digital content 14 when one or more data channels 20 are available, as further described below. In this manner, the content analysis engine 36 may customize or adapt the digital content 14 provided by the content providers 16 such that it is received according to user preferences, as further described below.

The content analysis engine 36 of the processor 26 may access the memory 28 to retrieve stored rules 22 and/or conditions 24. In certain embodiments, the storage 29 may be utilized to store the rules 22 and/or conditions 24, as well as the digital content 14. In certain embodiments, the rules 22 may be provided as an input to the user-defined devices 12 via the inputs/outputs 34. Further, in certain embodiments, the rules 22 may be configured within the memory 28 as a default manufacturing setting. A rule 22 may be any user/manufacturer defined command or processing instruction that is executed when a particular current condition 24 is present, as further described with respect to FIG. 2. The rules 22 may be pre-defined, such that when a particular condition 24 is detected, the user-defined device 12 may execute a particular action to customize or adapt the digital content 14. In certain embodiments, the user, the manufacturer, or content provider 16 may not pre-define the rules 22, but may be based on observations of historical behaviors of the user. In these situations, the rules 22 may be learned over time. In particular, it should be noted that in certain embodiments, one or more rules 22 and one or more conditions 24 may be linked within memory 28, such that when one is accessed or retrieved, another may also be accessed and retrieved.

Figure 2:
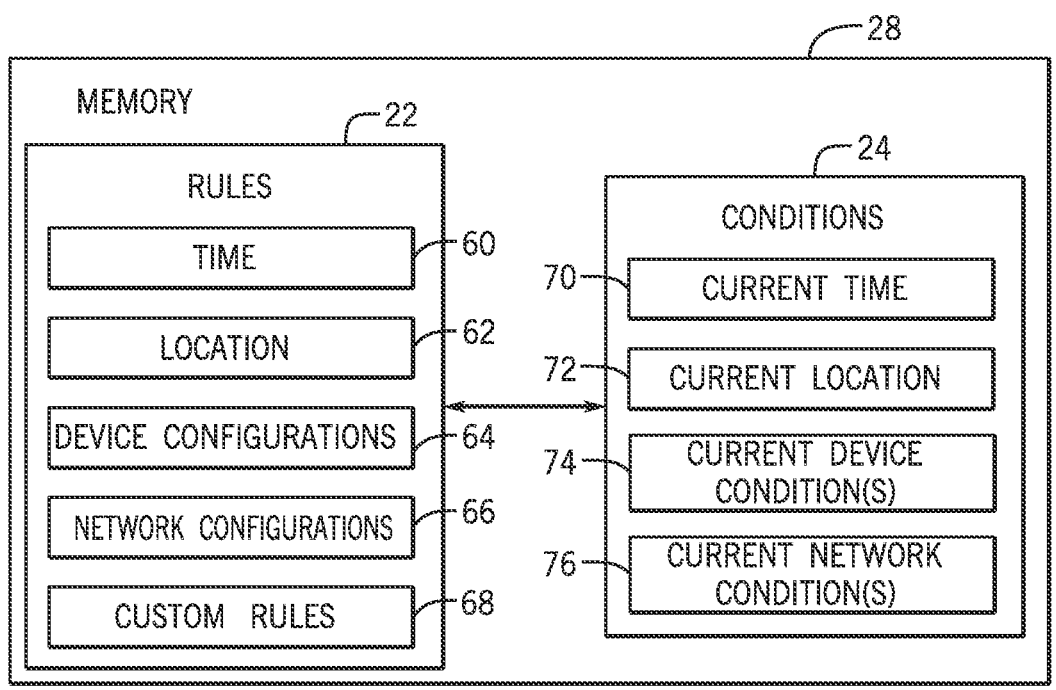
FIG. 2 is a diagrammatical representation of exemplary components and data flow of the user-defined device of FIG. 1, in accordance with aspects of the present embodiments.
Figure 3:
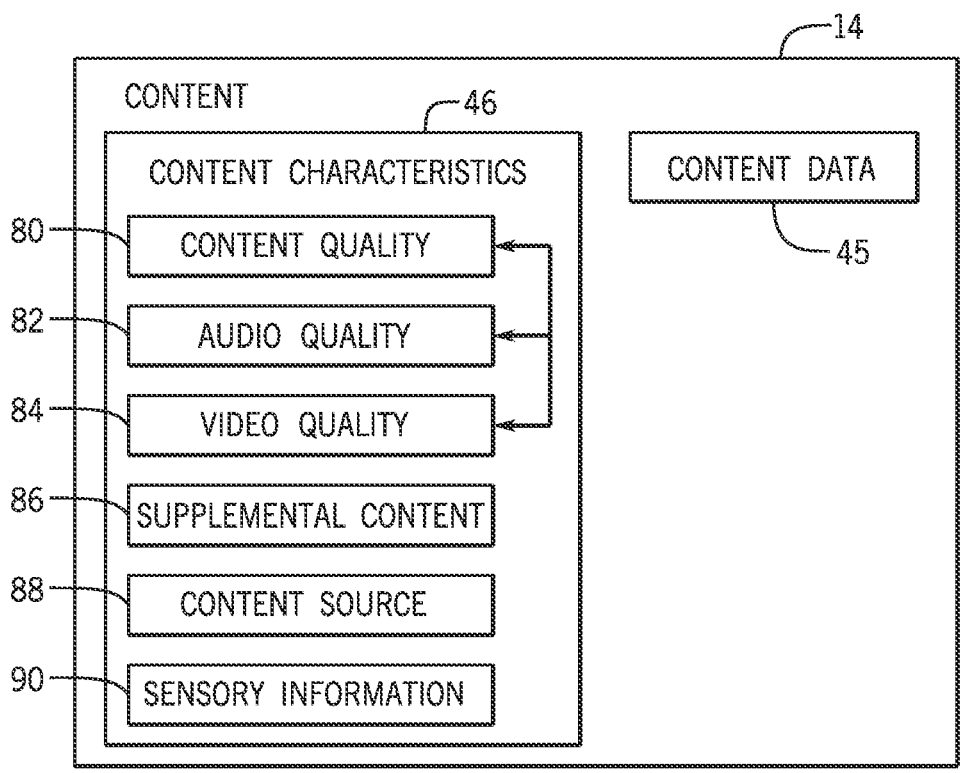
FIG. 3 is a diagrammatical representation of exemplary components and data flow within the digital content delivery system of FIG. 1, in accordance with aspects of the present embodiments.

In certain embodiments, the digital content 14 provided by the content providers 16 may include content data 45 which may include one or more content characteristics 46, as further described with respect to FIG. 3. In particular, the content data 45 may include may be any type of video, audio, multi-media, text, television and film programming, combined audio and video content, sensory information, or other desired digital content. Further, the content characteristics 46 may be features of the digital content 14 that may be adapted by the user to provide a user-defined experience when the digital content 14 is received. For example, the content characteristics 46 may relate to audio quality, video quality, overall digital content quality, content source, supplemental content information (e.g., information related to advertisements, source of advertisements, cost of delivery, cost of content quality, etc.), as further described with respect to FIG. 3. In particular, as noted above, the content analysis engine 36 may evaluate the rules 22 and/or the current operating conditions 24 to adapt the digital content 14 based on the rules 22 and/or conditions 24. Accordingly, the user-defined device 12 may receive the adapted digital content 14 in a manner that is pre-defined or configured by the user, as further described with respect to FIGS. 2-3.

As noted above, one or more content delivery systems 18 may be utilized to distribute the digital content 14 to the user-defined device 12. Such content delivery systems 18 may include or be adapted for two-way communication where available. The content delivery systems 18 may include television broadcast companies, cable providers, satellite programming providers, Internet-based content providers, radio stations, or any other providers of digital content. The illustrated embodiment depicts any one of a range of technologies that may be used for delivering the digital content 14 to the user-defined devices 12. For example, the Internet 40, broadcast (e.g., airways) technologies 42, and wired or wireless proprietary networks, such as cable and satellite technologies 44, may be utilized to transmit the digital content 14. Further, various ad hoc providers and/or mobile stations may be utilized as the content delivery systems 18 to deliver the digital content 14. In certain embodiments, the content delivery systems 18 may further include cellular networks, various types and topographies of networks (e.g., LANs, WANs, Bluetooth, etc.), electrical power networks (e.g., data over powerline). In some applications, the digital content may be delivered to one or more different user-defined devices (and data may be retrieved).

In particular, the content delivery system may utilize a plurality of data channels 20 to distribute the digital content 14. For example, in certain embodiments, the content delivery systems 18 may utilize a variety of data channels 20 that each utilize a different data communications protocol. In the illustrated embodiment, a long-term evolution (e.g., LTE) channel 47, a wireless local area network (e.g., WiFi) channel 48, a Bluetooth low energy (e.g., BLE) channel 50, an ultra high frequency (e.g., UHF) channel 52, and a near field communication (e.g., NFC) channel 54 are depicted. However, it should be noted that any number of data channels 20 utilizing any type of data communications protocol may be utilized within the system 10. As noted above, the content analysis engine 36 may customize or adapt the digital content 14 provided by the content providers 16 such that it is received according to user preferences. Accordingly, in certain embodiments, the content analysis engine 36 may evaluate the rules 22 and/or the current operating conditions 24 in order to select an appropriate data channel 20 to receive the digital content 14 when one or more data channels 20 are available.

In certain embodiments, the content analysis engine 36 may evaluate the rules 22 and/or the current operating conditions 24 in order to select and receive software 56 provided in lieu of and/or in addition to the digital content 14 provided by the content delivery systems 18. For example, the software 56 may be a set of machine-readable instructions that instructs the processor 26 to operate according to a particular data communications protocol (e.g., receive digital content 14 from a particular data channel 20). Accordingly, based on certain user-defined preferences, which may be determined via the rules 22 and/or the conditions 24, a bootloader 58 of the user-defined device 12 may receive and download the software 56. As an example, certain user preferences may indicate that the user-defined device 12 utilizes a particular data channel 20 when in a particular location. To manage this type of user-defined experience, the software 56 may be received and downloaded to implement the desired data channel 20. In certain embodiments, software 56 necessary to implement a wide variety of data communications protocols may be included within the user-defined device 12 so that it does not need to be received or downloaded.

As noted above, in certain embodiments, the content analysis engine 36 may evaluate the rules 22 and/or the current operating conditions 24 in order to select an appropriate data channel 20 to receive the digital content 14. However, in certain situations, the user-defined device 12 may be unable to implement the selected or desired data channel 20 because the processor 12 of the user-defined device 12 is not configured to receive from a particular data communications protocol. Accordingly, in these types of situations, the processor 26 may receive software 56 necessary to implement the desired data channel 20 with an available data channel 20. Further, once the software 56 necessary to implement the desired data channel 20 is available, the user-defined device 12 may switch to the desired data channel 20 to provide the user with the preferred user experience.

Turning to FIG. 2, an exemplary embodiment of the memory 28 storing the rules 22 and the conditions 24 is illustrated. While examples of rules 22 and conditions 24 are illustrated and discussed, it should be noted that a wide variety of rules 22 and conditions 24 may be utilized by the user-defined devices 12 and only a few illustrative examples are discussed below. In certain embodiments, the rules 22 may include rules related to time 60, location 62 (e.g., geo-location), device configurations 64, network configurations 66, or other custom rules 68. Further, in certain embodiments, the conditions 24 may include conditions related to current time 70, current location 72, current device conditions 74, or current network conditions 76.

As an example, in some situations, a user may wish to adapt the digital content 14 based on a preference related to time. To manage this type of user-defined experience, the user may first pre-define a time rule 70 to indicate, for example, that a high quality of digital content 14 is to be provided weekdays between 8 AM and 5 PM and a low quality of digital content 14 is to be provided at all other times. Accordingly, before digital content 14 is provided to the user-defined device 12, the content analysis engine 36 may evaluate the current time 70 and the time rule 60. Based on the current time 70, the content analysis engine 36 may adapt the quality of digital content 14 before it is received, thereby providing the user with the quality of experience preferred. Likewise, other types of user-defined experiences may be managed in a similar fashion. For example, the user may prefer digital content 14 to be provided over the LTE channel 47 when the user is inside of a particular entertainment venue (e.g., theme park, amusement park, stadium, theater, shopping mall, etc.), as further described with respect to FIG. 5. To manage this type of use-defined experience, the user may pre-define a location rule 62 to indicate, for example, that the LTE channel 47 should be utilized when the current location 72 is a particular entertainment venue. Accordingly, based on the current location 72, the user-define device 12 may receive digital content 14 through the LTE channel 47.

In certain embodiments, the user may wish to adapt the digital content 14 or select a data channel 20 based on a preference related to the device. Device configurations 64 may be rules 22 related to the type of user-defined device 12 utilized or based on the current operating device conditions 74. Current device conditions 74 may be the current operating condition of the device or a component of the device (e.g., low battery, full battery, black and white display, full color display, current sensory information, etc.). For example, the user may indicate that low quality digital content 14 is provided when the battery 36 is low. As a further example, the user may indicate that only video or only audio is provided based on the display 32 of the device 12 or based on other device components. As a further example, the user may indicate that advertisement-free digital content 14 is provided when the battery 36 is low. In certain embodiments, the user may wish to adapt the digital content 14 or select a data channel 20 based on a preference related to the network. Network configurations 66 may be rules 22 related to the network or network environment. Current network conditions 76 may be the current condition of the network, such as currently busy networks, available hotspots, available mesh networks, etc. For example, the user may indicate a prioritized list of data channels 20 to utilize when one or more data channels 20 are available. As a further example, the user may indicate that low quality digital content 14 is provided when the utilized network is busy or has multiple users.

In certain embodiments, the user may wish to adapt the digital content 14 or select a data channel 20 based on a combination of one or more rules 22 and/or a combination of one or more conditions 24. For example, the user may indicate a particular time (e.g., normal business hours) and a particular location (e.g., the office) where all digital content 14 is provided in high quality despite additional concerns, such as delivery or content quality costs. As a further example, the user may indicate a particular time (e.g., outside business hours) and a particular location (e.g., an entertainment venue such as a stadium) where all digital content 14 is provided advertisement free and sourced from a local content provider 16. Accordingly, by utilizing the rules 22 and conditions 24, the user may have greater control over how the digital content 14 provided by the content providers 16 is received by the user-defined devices 12. Indeed, in this manner, the user-defined device 12 may be configured as the main decision maker over the content characteristics 46 of the digital content 14 and/or over the type of data channel 20 the digital content 14 is received with.

FIG. 3 is an exemplary embodiment of the digital content 14 provided by the content providers 16. In the illustrated embodiment, the digital content 14 provided by the content providers 16 may include the content data 45 which may be associated with one or more content characteristics 46. In particular, the content data 45 may be any type of video, audio, multi-media, text, television and film programming, combined audio and video content, or other desired digital content. Further, the content characteristics 46 may be features of the digital content 14 that may be adapted by the user to provide a user-defined experience when the digital content 14 is received. For example, the content characteristics 46 may be associated with an overall content quality 80, an audio quality 82, a video quality 84, a content source 88, supplemental content information 86, and sensory information 90. The content source 88 may be associated with the location of the content provider 16, and may be related to either the content data 45 and/or the supplemental content 86. In certain embodiments, the supplemental content 86 may be associated with information related to the presence or absence of advertisements, cost of delivery for the content data 45 and/or the advertisements, the cost of content quality, and so forth. Further, in certain embodiments, the sensory information 90 may be associated with visual, auditory, somatic sensations (e.g., information related to touch such as textures), gustatory, olfaction, and/or vestibular information that the content provider 16 may wish to provide with content data 45 and/or as the digital content 14. In particular, any feature of the digital content 14 that may be adapted according to a user preference may be a content characteristic 46.

Figure 4:
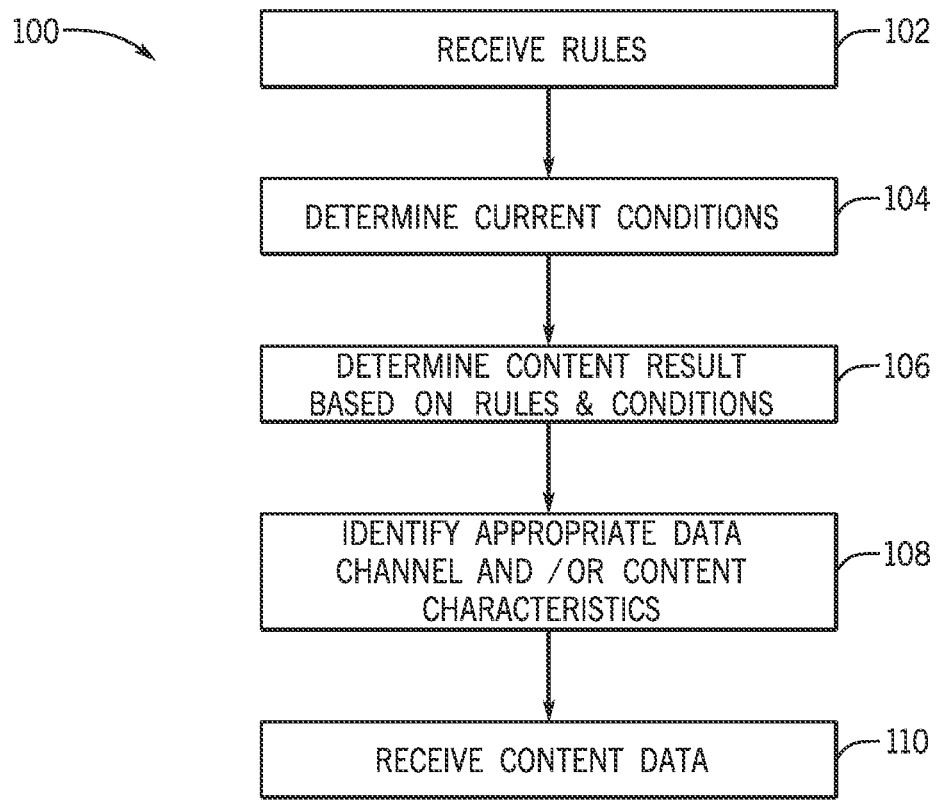
FIG. 4 is a flow chart illustrating exemplary logic that may be used to deliver digital content to the user-defined device of the digital content delivery system of FIG. 1, in accordance with aspects of the present embodiments.

FIG. 4 is a process 100 for delivering adapted digital content 14 to the user-defined device 12 of the digital content delivery system 10 of FIG. 1, in accordance with aspects of the present embodiments. In particular, the method 100 begins with the content analysis engine 36 accessing the memory 28 to retrieve the one or more rules 102 (block 102). As noted above, the rules 22 may be pre-defined as user inputs via the inputs/outputs 34 and/or may be manufacturing default settings. In certain embodiments, the rules 22 may be defined as company-set preferences, which may be stored with a company-owned user-defined device 12. In these types of situations, the user may unable to access or alter the rules 22 without authorization.

The method 100 further includes determining current operating conditions 24 (block 104). In certain embodiments, information related to the current operating conditions 24 may be detected via one or more sensors or detection systems of the user-defined device 12, and stored within the memory 28. In other embodiments, such information may be directly provided to the processor 26 in approximately real-time. In certain embodiments, based on the rules 22 and/or the conditions 24, the processor 26 may determine the content result (block 106). Specifically, the content result may be the adapted digital content 14 based on the pre-defined rules 22 and the current operating conditions 24. Accordingly, once the adapted digital content is determined, the processor 26 may identify an appropriate data channel 20 and/or the appropriate content characteristics 46 that relate to the adapted digital content (block 108). In addition, the method 100 includes receiving the digital content 14 according to the user-defined preferences (block 110).

Figure 5:
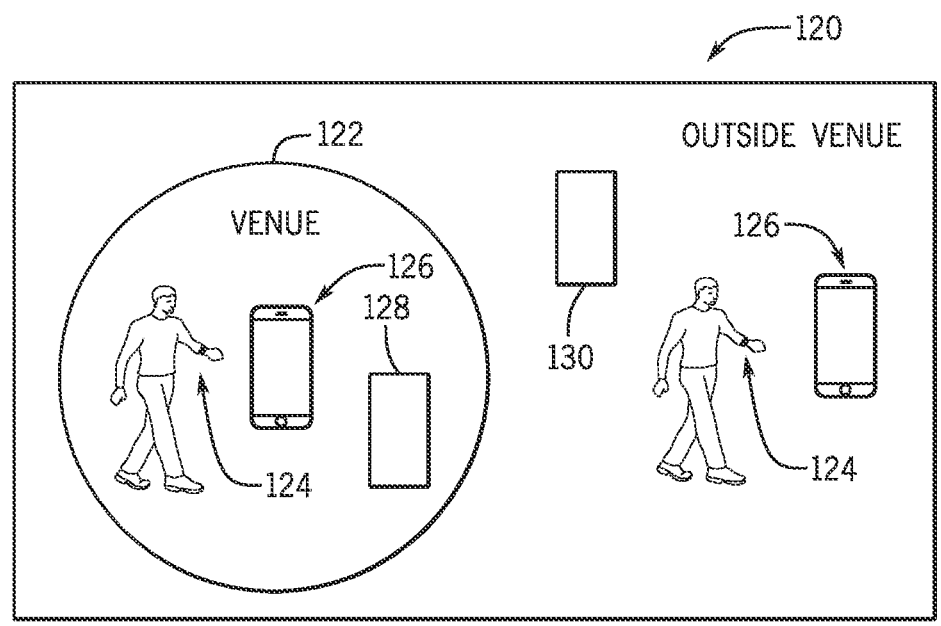
FIG. 5 is an illustration of a user experience, such as with the user-defined device of FIG. 1, in accordance with aspects of the present embodiments.

FIG. 5 is an illustration of a user experience 120 that may be implemented with the user-defined device 12 of FIG. 1, in accordance with aspects of the present embodiments. In certain embodiments, the user may geographically inside an entertainment venue 122, such as a theme park, an amusement park, a stadium, a theater, a shopping mall, a museum, or other attractions with thousands or hundreds of thousands of guests. In such situations, the user may prefer to adapt the digital content 14 received based on a location rule 62 and based on the current location of the user 72.

For example, in certain embodiments, the user may prefer to configure the user-defined device 12 and the received digital content 14 for real-time notifications related to the venue 122. For example, a user geographically within a theme park may wish to receive guest notifications or alerts, may wish to utilize the device 12 for hotels and parking services, or may wish to receive information related to maps, crowds, tickets, coupons, or rides within the theme park. Further, the user may prefer to use certain data channels 20 instead of other data channels 20 when geographically located within the venue 122, in order to avoid networks or channels 20 that may become slow in the population dense locations. To manage this type of use-defined experience, the user may pre-define a location rule 62 to indicate, for example, that digital content 14 should be adapted in a particular way when the current location 72 is the venue 122. For example, the user may indicate that the LTE channel 47 should be disabled for receiving digital content 14 when the user is within the venue 122. As a further example, the user may indicate that low quality content should be received when within the venue 122, in order to preserve the life of the battery 36. Likewise, the user may prefer to reconfigure the user-defined device 12 and the received digital content 14 when the user is outside of the venue 122. To manage this type of use-defined experience, the user may pre-define the location rule 62 to indicate, for example, that digital content 14 should be revert to typical settings when the current location 72 is outside of the venue 122.

In certain embodiments, the user-defined device 12 may be a wearable device 124, such as a wristband, a watch, goggles, glasses, a necklace, wearable electronic tattoos, etc. For example, the wearable device 124 may be low-cost device with a low-cost display 32 and/or basic notifications 38 components (e.g., a buzzer instead of speakers). In particular, the wearable device 124 may be securely attached to the user, which may be convenient for a theme park with rides and other attractions that limit personal smartphones. The wearable device 124 may include functionalities of the user-defined device 12, as described with respect to FIGS. 1-4. For example, the wearable device 124 may evaluate the rules 22 and/or the current operating conditions 24, select the data channel 20 based on the rules 22 and/or conditions 24, adapt the digital content 14 based on the rules 22 and/or conditions 24, and/or receive the adapted digital content 14 in a manner that is pre-defined or configured by the user.

Furthermore, in certain embodiments, the wearable device 124 may be linked or paired with a typical smartphone 126, which may also be configured as a user-defined device 12. In certain embodiments, the wearable device 124 may be configured to operate with certain data channels 20 (e.g., NFC, UHF, WiFi, BLE) when located within the park and certain data channels 20 when outside of the park (e.g., LTE). For example, in certain embodiments, when the user is geographically inside the entertainment venue 122, the wearable device 124 may be configured to source data from an antenna 128 disposed within the entertainment venue 122. Particularly, the antenna 128 within the venue 122 may provide the data channels 20 (e.g., NFC, UHF, WiFi, BLE) that the user may wish to use inside the park. Likewise, the wearable device 124 may be configured to source data from a different antenna 130 disposed outside the entertainment venue 122 when the user is geographically outside the entertainment venue 122. In these situations, the antenna 130 outside the venue 122 may provide certain data channels 20 that the user may wish to use outside of the park (e.g., LTE). Further, in certain situations, the wearable device 124 may evaluate the rules 22 and/or the current operating conditions 24 in order to select, receive, and download software 56 based on the location of the user. Further, in some situations, the wearable device 124 may utilize the smartphone 126 to receive software 56 necessary to implement a desired data channel 20 when transitioning between inside the venue 122 and outside the venue 122.

The invention claimed is:

1. A method, comprising:
using a processor of a personal computing device to:
receive one or more rules, conditions, or both related to receiving digital content, wherein the one or more rules indicate preferences for receiving the digital content;
determine one or more current operating conditions of the personal computing device corresponding to the one or more rules, conditions, or both;
identify one or more desired characteristics of the digital content, based on the one or more rules, conditions, or both and the current operating conditions;
identify a data channel from two or more available data channels, based upon the one or more rules, conditions or both;
configure the personal computing device to receive the digital content via the identified data channel; and
receive the digital content via the identified data channel, wherein the received digital content comprises the one or more desired characteristics.

2. The method of claim 1, wherein determining the current operating conditions corresponding to the one or more rules, conditions, or both comprises determining whether a display of the personal computing device is color or black and white.

3. The method of claim 1, wherein:
determining the current operating conditions corresponding to the one or more rules, conditions, or both comprises determining a current time, a current location of the personal computing device, or both; and
the one or more rules, conditions, or both use the current time, the current location, or both.

4. The method of claim 1, wherein the one or more rules, conditions, or both comprise rules, conditions, or both indicating that advertisement-free content is to be provided when a battery level of the personal computing device is low.

5. The method of claim 1, wherein the one or more rules, conditions, or both comprise custom rules indicating the one or more desired characteristics of the digital content that combine one or more rules, conditions, or both.

6. The method of claim 1, wherein the one or more desired characteristics of available digital content comprises a content provider, sensory information, delivery costs, quality costs, or information related to advertisements.

7. The method of claim 1, wherein the two or more available data channels comprise a combination of at least two of: a long-term evolution (e.g., LTE) channel, a wireless local area network (e.g., WiFi) channel, a Bluetooth low energy (e.g., BLE) channel, an ultra high frequency (e.g., UHF) channel, and a near field communication (e.g., NFC) channel.

8. The method of claim 1, comprising identifying and receiving software based on the one or more rules, conditions, or both and the current operating conditions.

9. The method of claim 1, comprising switching between the one or more data channels based on the one or more rules, conditions, or both and the current operating conditions.

10. The method of claim 9, comprising switching from a first data channel when a current location is within an entertainment venue to a second data channel when the current location is outside of the entertainment venue.

11. A system, comprising:
one or more content delivery systems configured to provide digital content via one or more data channels, wherein the digital content comprises one or more available content characteristics; and
a processor-based personal computing device configured to receive the digital content, wherein the processor-based personal computing device is configured to:
receive one or more rules, conditions, or both related to receiving the digital content;
determine one or more current operating conditions of the processor-based personal computing device corresponding to the one or more rules, conditions, or both; and
identify one or more desired characteristics of the digital content from among the available content characteristics, based on the one or more rules, conditions, or both and the current operating conditions;
identify a data channel from two or more available data channels, based upon the one or more rules, conditions, or both; configure the personal computing device to receive the digital content via the identified data channel; and
receive the digital content via the identified data channel, wherein the received digital content comprises the one or more desired characteristics.

12. The system of claim 11, wherein the one or more desired characteristics of the digital content comprises supplemental content information indicating whether supplemental content is desired to be provided with the digital content.

13. The system of claim 11, wherein the one or more rules, conditions, or both comprises a location rule related to a current location of the processor-based personal computing device and the current operating conditions comprises a current location of the processor-based personal computing device, and wherein the processor-based personal computing device is configured to receive the current location as at least one of the one or more desired characteristics of the digital content based on the location rule.

14. The system of claim 11, wherein the one or more desired or available content characteristics of the digital content comprise a particular delivery costs of the digital content to the processor-based personal computing device.

15. The system of claim 11, wherein the processor-based personal computing device comprises a smart-phone, a computer, a tablet, a hand-held computer, a laptop, a television set, or any combination thereof.

16. The system of claim 11, wherein the processor-based personal computing device comprises a wearable device, and wherein the wearable device comprises a wristband, a watch, goggles, glasses, a necklace, a heads-up display, or a combination thereof.

17. A tangible, non-transitory, computer-readable medium configured to store instructions executable by a processor of a personal computing device, wherein the instructions, when executed, are configured to:
receive one or more rules, conditions, or both related to receiving digital content, wherein the digital content comprises one or more available content characteristics;
determine one or more current operating conditions of the personal computing device corresponding to the one or more rules, conditions, or both;
identify one or more desired content characteristics among the one or more available content characteristics based on the one or more rules, conditions, or both and the current operating conditions;
identify a data channel from two or more available data channels, based upon the one or more rules, conditions, or both;
configure the personal computing device to receive the digital content via the identified data channel; and
receive the digital content via the identified data channel, wherein the received digital content comprises the one or more desired characteristics.

18. The computer-readable medium of claim 17, wherein the one or more rules, conditions, or both comprise a location rule and the current operating conditions comprise a current location of the personal computing device, and wherein the instructions are configured to identify and receive a high quality digital content when the personal computing device is in a first location.

19. The computer-readable medium of claim 18, wherein the executed instructions are configured to identify and receive a low quality digital content when the personal computing device is in a second location.

20. The computer-readable medium of claim 18, wherein the executed instructions are configured to configure the personal computing device to receive the digital content via the identified data channel, by:
identifying and downloading software based on the one or more rules, conditions, or both and the current operating conditions, the software comprising software for communicating via the identified data channel.

* * * * *